United States Patent Office.

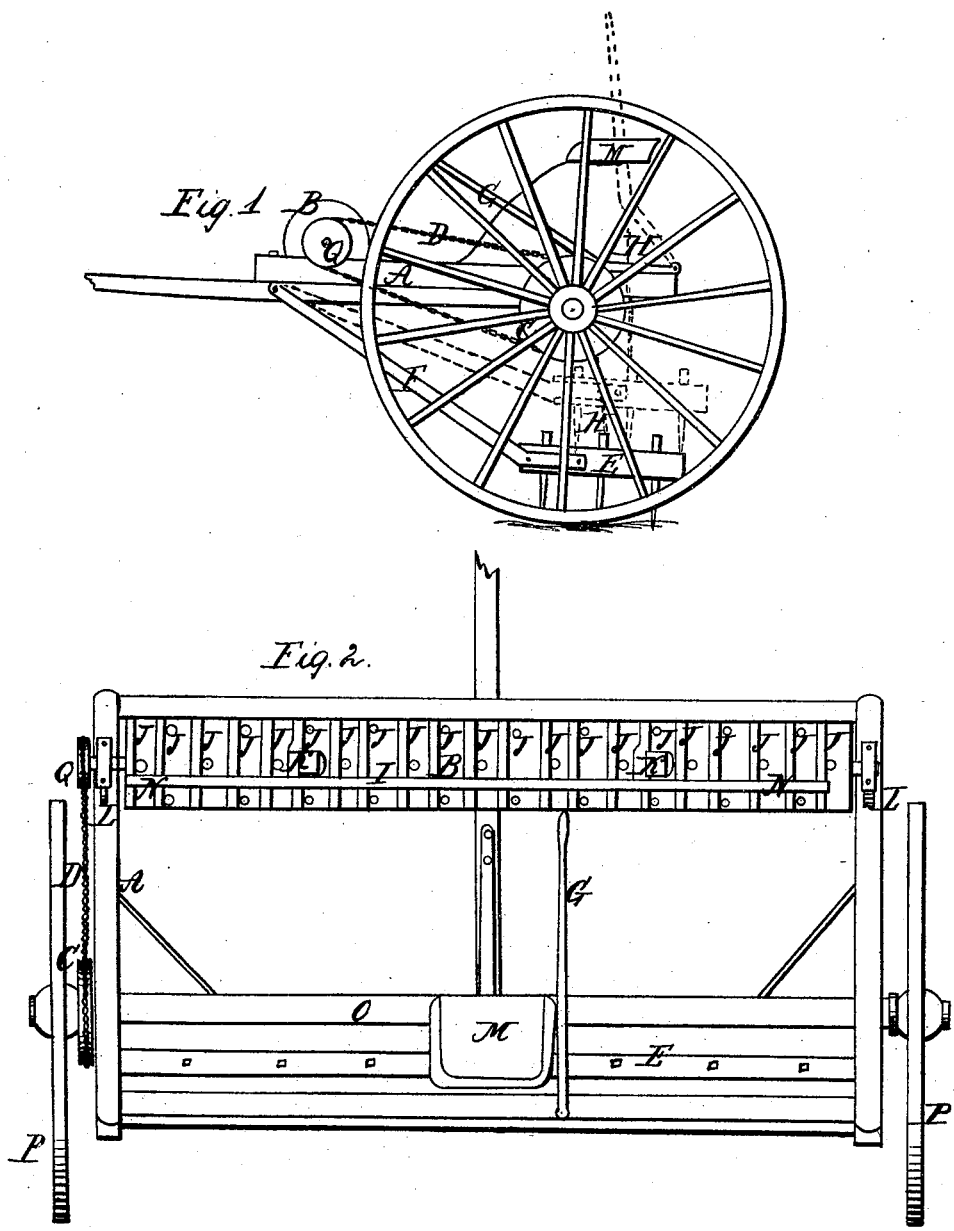

MYRON VANDEUSEN, OF OXFORD, MICHIGAN.

Letters Patent No. 89,710, dated May 4, 1869.

IMPROVEMENT IN COMBINED SEED-SOWER AND HARROW.

The Schedule referred to in these Letters Patent and making part of the same.

*To whom it may concern:*

Be it known that I, MYRON VANDEUSEN, of Oxford, in the county of Oakland, and State of Michigan, have invented a new and useful Improvement in Broadcast Seed-Sowers and Harrows combined; and I do declare that the following is a true and accurate description thereof, reference being had to the accompanying drawings, and to the letters of reference marked thereon, and being a part of this specification, in which—

Figure 1 is a side elevation of my device, and
Figure 2 is a top view of the same.

Like letters refer to like parts in each figure.

The nature of this invention relates to a rotary cylinder, perforated at intervals, and has surrounding it a number of rings, attached to a sliding bar, at the same distance apart as the perforations in the cylinder which contains the seed to be sown. This cylinder is revolved by means of a chain or belt from a pulley upon one of the traction-wheels, which carry the whole; also to a harrow suspended under the frame, between the wheels and in rear of said cylinder, and which is designed to cover the seed sown by the cylinder.

A, in the drawings, represents a suitable frame, surmounting and secured to the axle O, upon which revolve the traction-wheels P.

B is a cylinder properly journalled upon the front of the frame A, and is provided with hand-holes and covers K, through which it is filled with seed. It is also perforated with a series of parallel apertures, through which the seed is discharged.

J are rings, sliding on the cylinder, and secured to the bar I, and so arranged as to cover or uncover the apertures in the cylinder, and regulate the discharge of the seed therefrom.

Q is a pulley secured to the shaft of the cylinder, and obtains motion by means of the belt or chain D from the pulley C, which is rigidly attached to one of the traction-wheels.

E is a quadrangular harrow, provided with suitable teeth, and is pivoted to the fore part of the frame by the braces F, its position being between the wheels, and in rear of the cylinder, so as to cover the seed sown.

G is a lever, curved as shown, and pivoted to the rear bar of the frame A, and connected by a chain, H, to the harrow E, its use being to elevate from, or drop the harrow to the ground at pleasure, and is placed conveniently near the driver's seat M for that purpose.

To operate this device, fill the cylinder with seed, and adjust the rings J over the apertures in the cylinder, so as to permit the proper quantity of seed to pass out of them. Drop the harrow to the ground. Then, as the apparatus moves forward, the revolving cylinder discharges the seed through the apertures, which, falling to the ground, is covered by the harrow.

What I claim as my invention, and desire to secure by Letters Patent, is—

The arrangement of the perforated cylinder B, provided with sliding rings J and pulley Q, and the harrow E, with the frame A, axle O, wheels P, pulley C, belt D, braces F, lever G, chain H, and seat M, when operating substantially as and for the purposes herein set forth.

MYRON VANDEUSEN.

Witnesses:
ALEX. TER BUSH,
W. J. PEPPER.